(12) United States Patent
Honma

(10) Patent No.: US 9,509,868 B2
(45) Date of Patent: Nov. 29, 2016

(54) IMAGE FORMING APPARATUS AND IMAGE FORMING SYSTEM

(71) Applicant: Konica Minolta, Inc., Tokyo (JP)

(72) Inventor: Mikimasa Honma, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 40 days.

(21) Appl. No.: 14/060,043

(22) Filed: Oct. 22, 2013

(65) Prior Publication Data

US 2014/0139869 A1    May 22, 2014

(30) Foreign Application Priority Data

Nov. 16, 2012   (JP) .................................. 2012-252707

(51) Int. Cl.
*H04N 1/00* (2006.01)
*G06F 9/48* (2006.01)

(52) U.S. Cl.
CPC ........ *H04N 1/00347* (2013.01); *G06F 9/4856* (2013.01); *H04N 1/00278* (2013.01); *H04N 1/00352* (2013.01); *H04N 1/00954* (2013.01)

(58) Field of Classification Search
None
See application file for complete search history.

(56) References Cited

U.S. PATENT DOCUMENTS

2012/0092723 A1\* 4/2012 Jaudon .................. G06F 3/1204
358/1.15

FOREIGN PATENT DOCUMENTS

| CN | 101150640 A | 3/2008 |
|---|---|---|
| CN | 102316237 A | 1/2012 |
| JP | 2010-191543 A | 9/2010 |
| JP | 2011-197852 A | 10/2011 |

OTHER PUBLICATIONS

Japanese Office Action dated Oct. 29, 2014, issued in counterpart Japanese Application No. 2012-252707 and English translation thereof (total of 4 pages).
Office Action issued Jan. 29, 2016; Application or U.S. Pat. No. 201310572379.9; Applicant: Konica Minolta, Inc.; Title of Invention-creation: Image Forming Apparatus and Image Frming System; Total of 10 pages; English translation of Office Action; Total of 20 pages; Grand Total of 30 pages.

\* cited by examiner

*Primary Examiner* — Mohammad Ghayour
*Assistant Examiner* — Pawandeep Dhingra
(74) *Attorney, Agent, or Firm* — Lucas & Mercanti, LLP

(57) ABSTRACT

An image forming apparatus communicably connected to another image forming apparatus through a network includes a printer unit, a communication unit enabling a connection with another image forming apparatus, and a control unit that executes a first operating system (OS) operating on the first image forming apparatus and a control program operating on the first OS and performing a process relating to image formation, and enables a second OS performing other processes in parallel with the operation of the first OS to be operable. The control unit selects and determines another image forming apparatus in which the second OS is operable based on a process state relating to the image formation of the image forming apparatus operating the second OS, transmits an operating state of the second OS at that time point to the other image forming apparatus, and executes the second OS on the other apparatus.

9 Claims, 10 Drawing Sheets

IMAGE FORMING APPARATUS AND IMAGE FORMING SYSTEM

BACKGROUND OF THE INVENTION

1. Field of the Invention

The present invention relates to an image forming apparatus that forms an image and outputs the generated image on a sheet and an image forming system in which a plurality of image forming apparatuses are interconnected through a network.

2. Description of the Related Art

Image forming apparatuses such as a printer, a facsimile, and a copying machine, and a multi-function machine having a plurality of functions have a function of forming an image based on image data and outputting the image onto a sheet. Generally, the above-described function is realized by controlling the hardware of the image forming apparatus using firmware that executes on an operating system (OS).

In addition, image forming apparatuses are known which control each unit thereof by enabling a plurality of OS's to execute (for example, see Japanese Patent Application Laid-Open No. 2010-191543).

In Japanese Patent Application Laid-Open No. 2010-191543, an emulation device has been proposed which includes a virtual operating system OS1 operating controller software and an operating system OS2 operating operation unit software and handles communication between a controller and an operation unit as communication between the operating systems OS1 and OS2.

In addition, a computer system has been proposed in which the resource use rates are informed by a plurality of physical servers having virtual machines operating therein, and live migration of a virtual machine operating in a physical server having a shortage of resources to a physical server having sufficient resources is performed (see Japanese Patent Application Laid-Open No. 2011-197852).

However, in image forming apparatuses, there is a request for realizing various functions other than the process relating to image formation such as a function for operating an application handling a document by starting an operating system (for example, Windows or Linux (both are trademark)) used for a general personal computer (PC) in the image forming apparatuses, in addition to an original operation of the image forming apparatuses relating to image formation.

However, since apparatus control firmware controlling such an image forming apparatus has only a function for controlling the image forming apparatus built therein, a process such as editing data to be output and the like is impossible to be performed in the apparatus, and it is necessary to perform the operation using the PC having the original data.

In order to fulfill the above-described request, an apparatus of a multi-OS may be considered which operates a guest operating system other than a host operating system operating the image forming apparatus in parallel with the host operating system.

However, in an apparatus requiring performance stability like the image forming apparatus, when hardware resources are shared between the original operating system of the image forming apparatus and another operating system, hardware resources are consumed by the guest operating system, and there is a concern that the original performance of the image forming apparatus that is needed the most may be degraded. Accordingly, cases occur in which the guest operating system ends when the resources of the guest operating system are desired to be used by the host operating system due to a job input or the like in the multi-OS environment, and it is necessary to wait for the end of the job.

In Japanese Patent Application Laid-Open No. 2011-197852, while a measure that performs live migration to a physical server having sufficient resources based on the use rate of the resources has been proposed, a measure that, in precedence to the original operating system of the image forming system, enables another operating system to be operated by another image forming apparatus has not been proposed at all. When migration is performed only from a viewpoint of the sufficiency of resources, there may be a case where the host operating system of the image forming apparatus is not operable.

The present invention is directed to provide an image forming apparatus and an image forming system that enable a second operating system, which performs other processes other than the process relating to the image forming apparatus, to be operated by another image forming apparatus in accordance with the processing state of image formation.

SUMMARY OF THE INVENTION

To achieve at least one of the above-mentioned objects, an image forming apparatus reflecting one aspect of the present invention, which is connected to be communicable with one or two or more image forming apparatuses different from each other through a network, includes: a printer unit that forms an image based on image data and outputs the image onto a sheet; a communication unit that enables a connection with at least another image forming apparatus through a network; and a control unit that can execute a first operating system activating on the image forming apparatus and a control program activating on the first operating system and performing a process relating to image formation and enables one or two or more second operating systems performing other processes other than the image formation in parallel with the operation of the first operating system to be operable, wherein the control unit selects and determines another image forming apparatus in which the second operating system is operable based on a process state relating to the image formation of the image forming apparatus operating the second operating system, transmits an operating state of the second operating system at that time point to the other image forming apparatus, and executes the second operating system by switching to the other image forming apparatus.

In the above-mentioned image forming apparatus, it is preferable that the control unit executes the second operating system in parallel with the operation of the first operating system so as to be operable.

In addition, in the abovementioned image forming apparatus, it is preferable that the control unit provides information of a second operation screen in the second operating system to another image forming apparatus connected to the image forming apparatus through a network, and an operation screen server receiving an operation input for the second operation screen provided to the other image forming apparatus may be operable.

In addition, in the above-mentioned image forming apparatus, it is preferable that the control unit receives information of a second operation screen in the second operating system that is provided by an operation screen server executed in another image forming apparatus, and an operation screen client that enables an operation input for the second operation screen may be operable.

In addition, in the abovementioned image forming apparatus, it is preferable that the control unit determines the process state relating to the image formation based on the type of the input job.

In addition, in the abovementioned image forming apparatus, it is preferable that the control unit determines the process state relating to the image formation based on one or both of the amount and the type of a reserved job.

In addition, in the abovementioned image forming apparatus, it is preferable that the control, unit performs the determination before executing the job in accordance with a state of hardware resources that is based on the job.

In addition, in the abovementioned image forming apparatus, in the case in which another image forming apparatus that is a target of the switching is unable to be determined based on a state of the other image forming apparatuses on the network, it is preferable that the control unit stops the second operating system in a predetermined state and store the operating state relating to the second operating system so as to be started to be continued in the same state.

In addition, in the abovementioned image forming apparatus, it is preferable that the control unit enables a user to select whether the operation of the second operating system is continued or stopped based on a state of the image forming apparatus in which the second operating system executes.

In addition, in the abovementioned image forming apparatus, in the case in which the operation is stopped, it is preferable that the control unit stops the second operating system in a predetermined state and store the operating slate relating to the second operating system so as to be started to be continued in the same state.

In addition, in the abovementioned image forming apparatus, in the case in which the second operating system is executed by another image forming apparatus in accordance with the switching, it is preferable that the control unit stops the second operating system on the other image forming apparatus in accordance with a state of the image forming apparatus in which the second operating system executed before the switching and execute the second operating system by using the image forming apparatus in which the second operating system executed before the switching again.

In addition, in the abovementioned image forming apparatus, in the other image forming apparatus in which the second operating system executes in accordance with the switching, it is preferable that an operation screen server is operable which provides information of the second operation screen in the second operating system to still another image forming apparatus that is connected to the other image forming apparatus through a network and receives an operation input for the provided second operation screen, and in the control unit, an operation screen client that receives the information of the second operation screen in the second operating system that is provided by the operation screen server operating in the other image forming apparatus and enables an operation input for the second operation screen is operable, and the control unit may stop the second operating system on the other image forming apparatus in accordance with a connection state between the operation screen server and the operation screen client and execute the second operating system in the image forming apparatus in which the second operating system executed before the switching again.

To achieve at least one of the abovementioned objects, an image forming system reflecting one aspect of the present invention includes: the image forming apparatus according to any one of the abovementioned configurations as a first image forming apparatus; a second image forming apparatus including a printer unit that forms an image based on image data and outputs the image onto a sheet, a communication unit that enables a connection with at least another image forming apparatus through a network, and a control unit that can execute a first operating system activating on the image forming apparatus and a control program activating on the first operating system and performing a process relating to image formation and enables one or two or more second operating systems performing other processes other than the image formation in parallel with the operation of the first operating system to be operable; and a network that connects the first image forming apparatus and the second image forming apparatus to be communicable with each other, wherein the control unit of the second image forming apparatus receives an operating state of the second operating system transmitted from the first image forming apparatus and executes the second operating system.

In addition, in the above-mentioned image forming system, in the control unit of the second image forming apparatus, an operation screen server is operable which provides information of the second operation screen in the second operating system to another image forming apparatus that is connected to the second image forming apparatus through a network and receives an operation input for the second operation screen that is provided for the other image forming apparatus, and wherein, in the control unit of the first image forming apparatus in which the second operating system was operable before the switching, an operation screen client that receives the information of the second operation screen in the second operating system that is provided by the operation screen server operating in the other image forming apparatus and enables an operation input for the second operation screen is operable, and the control unit of the second image forming apparatus, when the transmission is received and the second operating system is executed, provides information of the second operation screen for the first image forming apparatus in which the second operating system was operable before the switching.

DETAILED DESCRIPTION OF THE PREFERRED EMBODIMENTS

Hereinafter, an image forming apparatus according to an embodiment of the present invention will be described with reference to the accompanying drawings.

Figure 10:
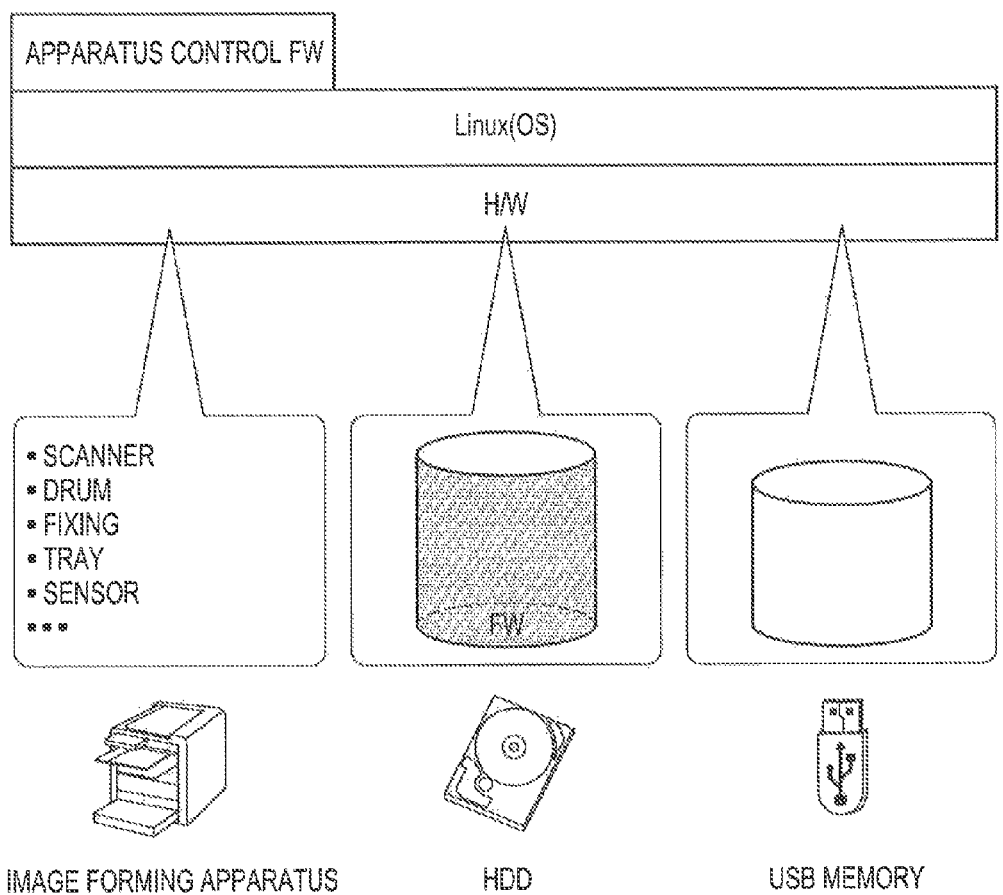
FIG. 10 is a schematic diagram illustrating the software configuration and hardware resources of a conventional image forming apparatus.

As illustrated in FIG. 10, in the configuration of a conventional image forming apparatus, an operating system (for example, Linux (trademark)) that starts apparatus control firmware on hardware is loaded, and the apparatus is controlled by starting apparatus control firmware on the operating system. The control of the apparatus spans over various fields such as starting a scanning process and a printing process and storing image data in a hard disk drive (HDD), management of the temperature for thermal fixation, and a sensor detecting the opening/closing of a tray or a door.

Figure 1:
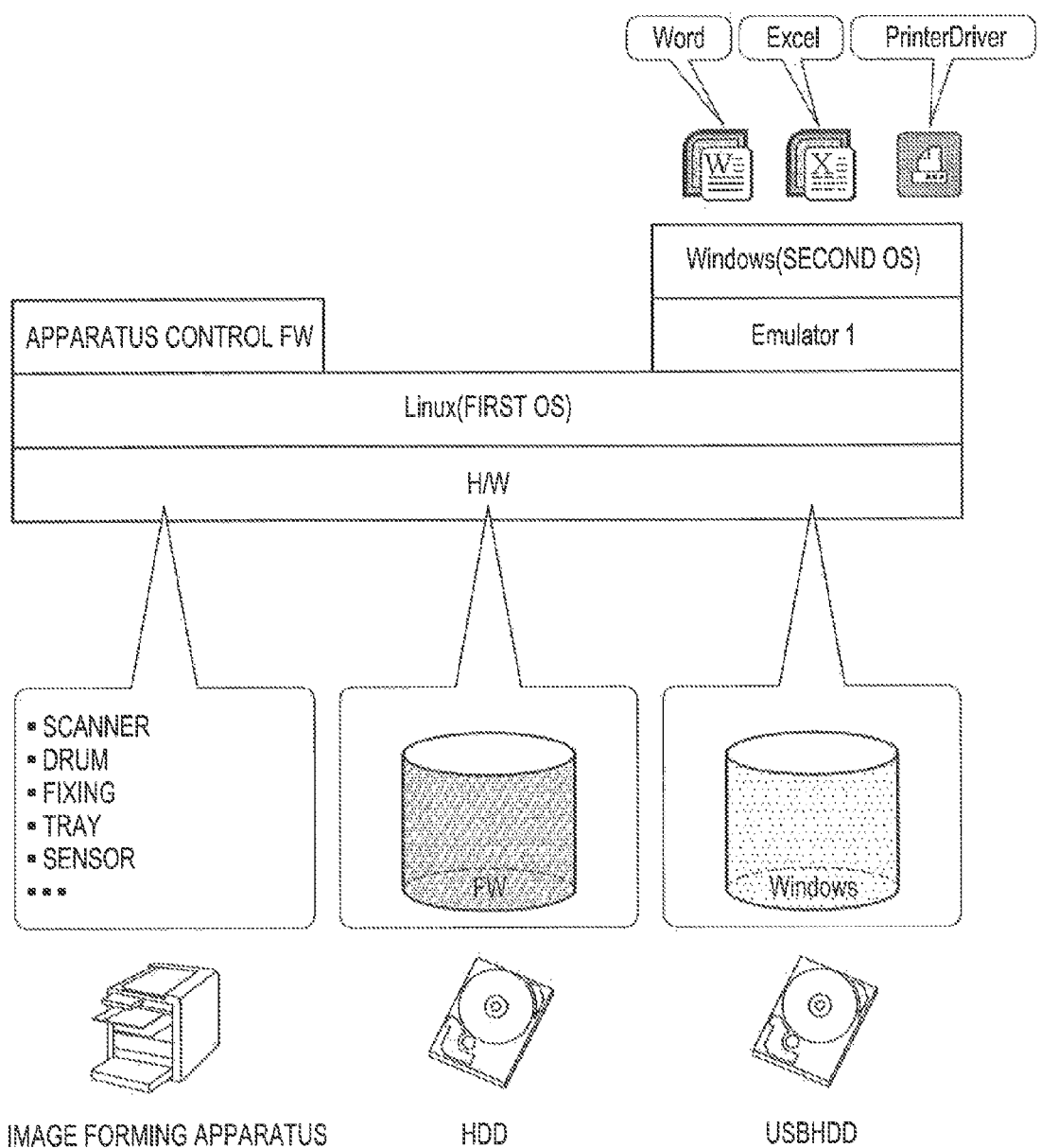
FIG. 1 is a schematic diagram illustrating the software configuration, which includes application software, and hardware resources in an image forming apparatus according to an embodiment of the present invention.

FIG. 1 is a schematic diagram illustrating the software configuration of the multi-operating system and hardware resources in an image forming apparatus according to this embodiment.

In FIG. 1, an apparatus control firmware (hereinafter referred to as apparatus control FW) and Emulator 1 (hereinafter, simply referred to as an emulator) execute first operating system (hereinafter, referred to as a first OS). As the emulator, for example, Qemu (trademark) may be used. However, the emulator is not limited to a specific type of emulator in this embodiment.

The first OS is a general-purpose OS that executes the apparatus control FW and the emulator and is configured by Linux, Windows (trademark), or the like. The apparatus control FW is software that executes the image forming apparatus and controls an operation unit 140 and the like included in the image forming apparatus. The operation unit 140 performs various displays and receives an operation input. The operation unit 140 displays a screen transmitted from the apparatus control FW, displays a screen transmitted from a second OS, or receives an operation for any one of those screens. The operation and the display may be performed by an operation unit and a display unit that are separate from each other.

The emulator according to this embodiment has a function called a "live migration" for operating the second operating system that is in the middle of the operation on another apparatus on the network. In addition, the emulator has a function called a "snapshot" for recording an operation status of the apparatus at a specific moment.

On the emulator, the second operating system (hereinafter, referred to as the second OS) activates on the first OS. The emulator is software that provides the second OS by emulating the hardware. The second OS is an OS that activates an image data editing application or the like and is configured by Linux, Windows (trademark), Mac-OS (trademark), and the like. In FIG. 1, Windows is illustrated.

Here, in order to execute another OS as a second OS in the apparatus through an emulator or the like in addition to a first OS starting the control apparatus FW is called a multi-OS.

In this embodiment, only one OS is illustrated as a second OS operating on the first OS, the number of the second OS's is not particularly limited thereto, and thus two or more OS's different from each other may execute.

In addition, in this embodiment, although the second OS is described to execute on the first OS through the emulator, the first OS and the second OS may execute on a hypervisor in parallel with each other, and the configuration relation thereof is not particularly limited as long as the first OS and the second OS execute in parallel with each other.

On the second OS, Word (trademark), Excel (trademark), a printer driver provided for Windows, and the like execute as applications handling a document file.

As the printer driver, a printer driver that is normally ready by being loaded into a personal computer (PC) may be used. In this embodiment, it is not necessary to use a printer driver that is provided dedicatedly to the image forming apparatus. However, a printer driver that is dedicatedly provided may be used.

The first OS and the apparatus control FW described above are included in the image forming apparatus and can control hardware resources (hereinafter, referred to as H/W) of the present embodiment. In addition, the second OS may be included in the image forming apparatus or may execute in another image forming apparatus and be operable by using an operation screen server to be described later or the like.

As the H/W, in addition to the operation unit 140, there are a scanner that achieves a main function of the image forming apparatus, a drum, a fixing unit, a sheet feed tray, various sensors, an HDD, an external medium (for example, a USB memory), and the like. All the H/W is directly accessible from the first OS. On the other hand, the second OS is an OS that is executed by a general PC and does not directly access image forming apparatus-specific H/W. However, the H/W such as an HDD and a USB memory that are used also in a general PC is directly accessible from the second OS as well.

In the HDD, apparatus control FW, a first OS, a second OS, applications, a printer driver, print data, ripped data used for image formation, data handled in each application, and the like may be stored. In such a case, the HDD may control a read and write area for each application by demarcating partitions, for example, as a partition for apparatus control FW, a partition for applications of the second OS, and the like.

The data used by the second OS is preferably stored in an HDD other than the HDD used by the apparatus control FW (for example, an HDD connected through a USB). The reason for this is not to cause the degradation of the performance due to the use of the HDD at the time of performing image formation using the apparatus control FW.

In the case in which data (for example, Word document data) to be output is placed in an external PC on the network, the data may be copied into a shared folder of Windows (second OS) inside the image forming apparatus. The storage destination may be designated by setting individual IP addresses to the apparatus control FW and the second OS through a bridge connection. In the case in which original data is stored in an area of the HDD that is managed by the second OS, and needs to be changed before output, the original data may be edited by starting an application (Word) on the second OS. In the case in which the original data is to be stored, similar to a general PC, the data may be stored in an area of the HDD that is managed by the second OS. In addition, by switching between the screens of the apparatus control FW and the second OS using the operation unit 140, the data may be edited while the content thereof is displayed.

In this embodiment, since the second OS is an OS that is used by a general personal computer, it is apparent that data processed by applications used thereby may be used on the second OS. Other than Word described above, excel, emacs (an editor used in Linux), or the like may be started, and, when data supplied from an external PC is stored in the apparatus, it can be edited in the apparatus. As described above, the original data can be edited in the image forming apparatus, and thereby the usability of the data is improved.

Figure 2:
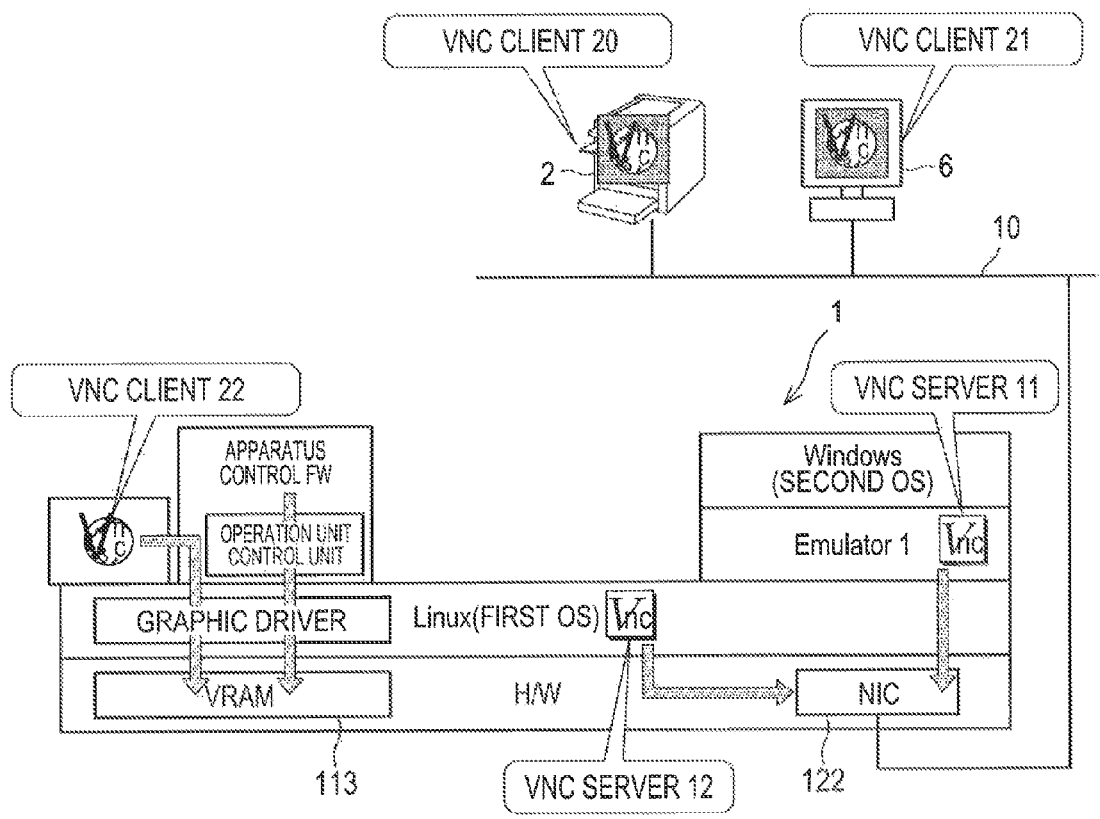
FIG. 2 is a diagram illustrating the software configuration and the network configuration of an operating screen server.

As illustrated in FIG. 2, according to this embodiment, in the first OS and the emulator, VNC servers (trademark) 11 and 12 corresponding to the OS's thereof are arranged. FIG. 2 illustrates that an image forming apparatus 2 and a PC 6 that is an external device are connected to an image forming apparatus 1 through a network 10.

The VNC server 11 provides screen data of the second OS to a VNC client 20 included in the image forming apparatus 2, a VNC client 21 included in the PC 6, and a VNC client 22 included in the image forming apparatus 1. In addition, the VNC server 12 provides screen data of a VRAM 113 included in the image forming apparatus 1 to the VNC clients 20 and 21. Each VNC client acquires the screen data from the VNC server and displays a screen acquired from being delivered to the operation units of the devices thereof (the image forming apparatus 1, the PC 6, and the image forming apparatus 2) and has a function for receiving an operation for the screen and delivers the received operation to the VNC server. In addition, each VNC server receives operation information from the connected VNC client and delivers the operation information to the OS corresponding thereto. In this way, the operation units of the image forming apparatuses 1 and 2 and the PC 6 on the network can perform operations for the OS's. The VNC server corresponds to an operation screen server, and the VNC client corresponds to an operation screen client.

In a configuration in which the emulator is not used, an operation screen server may be arranged in each OS. Here, the VNC server 12 used for the first OS may be configured by hardware.

Specifically, the VNC client 22 executed by the first OS of the image forming apparatus 1 is connectable to the VNC server 11 of the second OS, and the VNC clients 20 and 21 included in the image forming apparatus 2 and the PC 6 other than the image forming apparatus 1 are connectable to the VNC senders 11 and 12 of each OS through the NIC 122. Although not illustrated in FIG. 2, similarly, the image forming apparatus 2 is equipped with a VNC server and can provide a second operation screen to the image forming apparatus 1 and the PC 6.

An operation unit control unit 142 (illustrated in FIG. 3) selects one or combines both of the screen image generated by the apparatus control FW and the screen image acquired from the VNC server 11 through the VNC client 22 and draws a resultant screen image in the VRAM 113 through a graphic driver. On the operation unit 140, a screen is displayed based on the drawn data that has been drawn in the VRAM 113. In addition, regarding operations performed on the screens, an operation for the screen generated by the apparatus control FW is received by the apparatus control FW, and an operation for the screen acquired from the VNC server 11 is input to the connected VNC server 11 through the VNC client 22. A control unit of the image forming apparatus 1 controls the operation of the image forming apparatus 1 based on the content of an operation received by the apparatus control FW. The operation input to the VNC server 11 is input to the corresponding second OS, and the OS executes based on the content of the operation. In the case in which the VNC server is accessed by any one of the VNC clients, accesses from the other VNC clients are restricted. The VNC server may notify the other VNC clients that the access to the corresponding VNC is restricted or the like.

In the VNC client 22, the second OS operating in the image forming apparatus 2 through a second operation screen provided from the VNC server, which is included in the image forming apparatus 2, can be executed.

Figure 3:
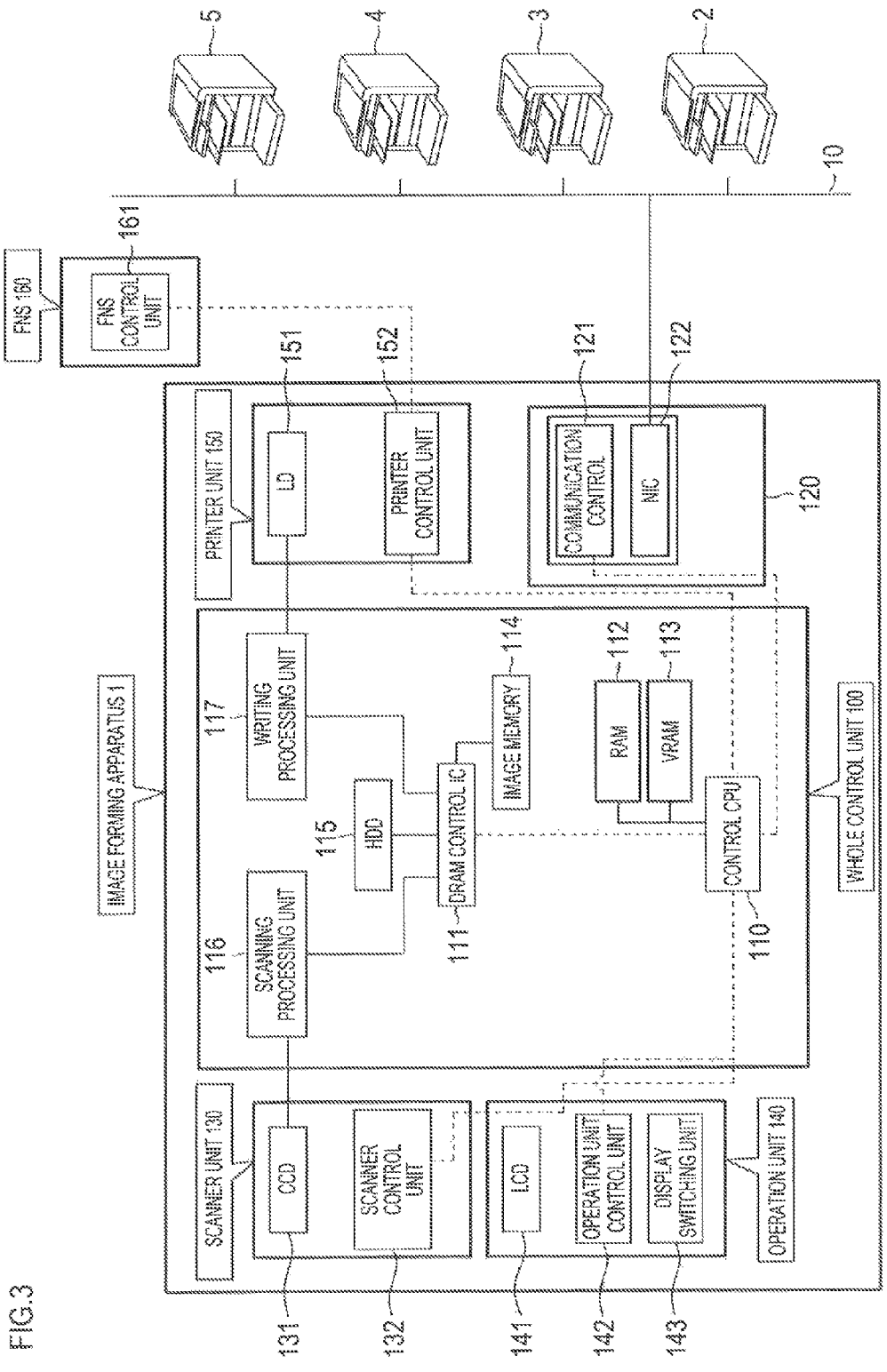
FIG. 3 is a control block diagram.

FIG. 3 is a diagram illustrating the control blocks of the image forming apparatus 1 according to this embodiment.

The image forming apparatus 1 includes a whole control unit 100, a scanner unit 130, an operation unit 140, and a printer unit 150 as its main constituents. In this embodiment, an FNS 160 that is a post processing apparatus is connected to an image forming apparatus main body as a part of the image forming apparatus. However, in an embodiment of the present invention, the presence/no-presence of the post processing apparatus is not particularly limited.

The image forming apparatus 1 is connected to image forming apparatuses 2 to 5 that are external devices through a LAN 10 that is a network. Here, the types or the number of devices connected to the image forming apparatus 1 is not particularly limited. The above-described image forming apparatus 1, the LAN 10, and the image forming apparatuses 2 to 5 configure a part or the whole of an image forming system. Although not illustrated in FIG. 2, the PC illustrated in FIG. 2 may be connected to the LAN 10.

The whole control unit 100 is equipped with a control CPU 110 that corresponds to a processor, and a DRAM control IC 111 is connected to the control CPU 110.

In addition, a RAM 112 and a VRAM 113 are connected to the control CPU 110.

The control CPU 110 controls the overall operation of the image forming apparatus 1 by executing software such as the apparatus control FW, thereby acquiring the entire state of the image forming apparatus 1.

The scanner unit 130 is equipped with a CCD 131 that performs optical scanning and a scanner control unit 132 that controls the overall operation of the scanner unit 130. The scanner control unit 132 is connected to the control CPU 110 so as to be controlled by the control CPU 110. The scanner control unit 132 may be configured by a CPU, a program for operating the CPU, and the like. Data processing is performed on image information scanned by the CCD 131 by a scanning processing unit 116. The DRAM control IC 111 is connected to the scanning processing unit 116, and the image data for which data processing has been performed by the scanning processing unit 116 is transmitted to the DRAM control IC 111.

Programs such as the apparatus control FW, the first OS, the second OS, an application program, and a printer driver are loaded into the RAM 112, and the RAM is used for the execution of the programs and is used as a work area accompanied with the execution. In addition, an area for storing the screen data of the second OS is allocated in the RAM 112, and the screen data of the second OS stored in this area is provided to the VNC client by the VNC server 11.

The operation unit 140 is equipped with an LCD 141 of the touch panel type and an operation unit control unit 142. The LCD 141 and the operation unit, control unit 142 are connected together, and the operation unit control unit 142 and the control CPU 110 are connected together to be serially communicable. By employing such a configuration, the operation unit 140 is controlled by the control CPU 110, and whereby a screen image drawn in the VRAM 113 is displayed on the LCD 141, and input information input to the operation unit 140 is transmitted to the control CPU 110.

Figure 9:
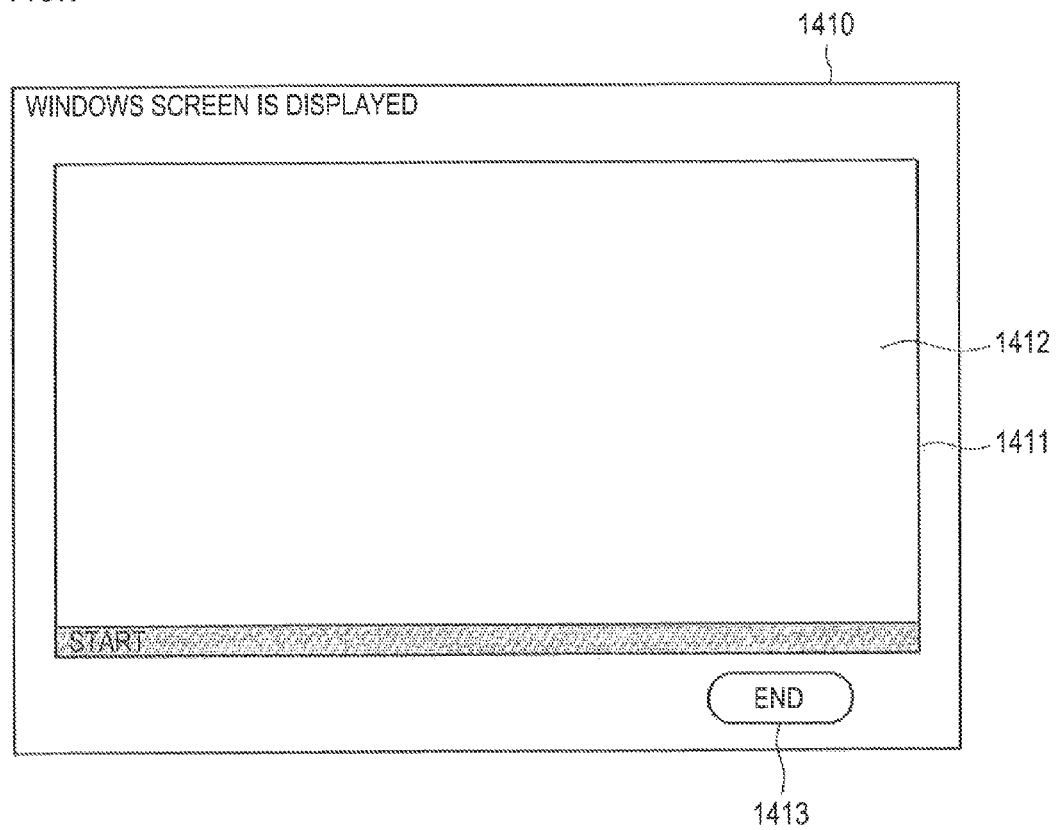
FIG. 9 is a diagram illustrating a second OS screen.

The operation unit control unit 142 may be configured by a CPU, a program operating the CPU, and the like. The operation unit 140 is equipped with a display switching unit 143. By selectively drawing the screen generated by the apparatus control FW and the screen of the second OS that is acquired by the VNC client in a storage area of the VRAM 113 corresponding to a predetermined area of the screen displayed by the operation unit 140 by using the display switching unit 143, such screens may be displayed in a switched manner. An operation performed within an OS screen 1412 of the LCD 141, which is illustrated in FIG. 9, is delivered to the VNC server through the VNC client. From this, an operation for the second OS can be performed.

Hereinafter, the displaying of the screen of the second OS on the operation unit 140 of the image forming apparatus 1 will be described in detail.

When a request (according to a user's operation or the like) for switching to the second OS screen is generated, the apparatus control FW acquires screen data of the OS from the VNC server corresponding to the designated OS through the VNC client 22. Then, a display screen is generated by the operation unit control unit 142, and the display screen data is written into the VRAM 113 by the graphic driver. The whole display screen may be configured as the OS screen, or the OS screen may be put into a predetermined area of the screen.

In this embodiment, as illustrated in FIG. 9, the OS screen 1412 is inserted into a predetermined area 1411 of the screen 1410. From this, the OS screen 1412 is displayed on the operation unit 140.

On the screen illustrated in FIG. 9, an operation for an outer area of the area 1411 is received by the apparatus control FW, and the apparatus control FW performs an operation according to the operation (for example, an operation of an "End" button 1413 illustrated in FIG. 9). On the other hand, an operation for the inside of the area 1411 is delivered to the VNC server through the VNC client and is input to a corresponding OS. From this, an operation for the second OS can be performed.

The reason for not configuring the whole screen as the OS screen but configuring the OS screen to be inserted into a predetermined area in this embodiment is as follows. In a case where the whole screen is configured as the OS screen, all the operations performed on the screen are not received by the apparatus control FW but delivered to the VNC server. Thus, in order to end the OS screen and to return to the screen of the apparatus control FW or switch to another OS screen, a unit receiving an operation by means other than a screen operation such as the arrangement of an additional hard key is necessary, and thus the cost increases.

The DRAM control IC 111 is connected to an image memory 114. In the image memory 114, image information acquired by the scanner unit 130, image information, a printing condition, and file information acquired through the LAN 10, and the like are stored. As described above, the image memory 114 is a storage area of the image information, the printing condition, and the file information and stores information of jobs to be printed.

In addition, an HDD 115 is connected to the DRAM control IC 111. As described above, areas for storing the first OS, the second OS, applications, document file data generated by the applications, printer drivers, image information, printing information, and the like are allocated to the HDD 115 in accordance with the first OS and the second OS. The areas of the HDD 115 may be demarcated respectively for the first OS and the second OS, or the HDD 115 may be configured by a plurality of HDDs to be allocated for the first OS and the second OS.

Furthermore, a writing processing unit 117 is connected to the DRAM control IC 111. The writing processing unit 117 is connected to an LD 151 of the printer unit 150 and processes data used for the operation of the LD 151. In addition, the printer unit 150 includes a printer control unit 152 that controls the overall operation of the printer unit 150, and the printer control unit 152 is connected to the control CPU 110 and thus is controlled. An FNS control unit 161 that controls the overall operation of the FNS 160 is connected to the printer control unit 152. From this, the FNS 160 can be controlled by the control CPU 110 through the printer control unit 152.

In addition, a communication control unit 121 that controls the overall operation of the communication unit 120 communicating with an external device is connected to the control CPU 110 and is connectable to the LAN 10 through a NIC (a network interface card) 122 included in the communication unit 120. The communication control unit 121 operates in accordance with an operation instruction from the control CPU 110, transmits data delivered from the control CPU 110 in compliance with a transmission protocol set in advance to the LAN 10 through the NIC 122, receives the data transmitted from the LAN 10 through the NIC 122, and transmits the received data to the control CPU 110. Accordingly, the operation screen information of the VNC servers 11 and 12 is transmitted to the VNC clients of the image forming apparatuses 2 to 5 through the NIC 122 and the LAN 10, and information of operation inputs performed on the operation screen by the image forming apparatuses 2 to 5 is transmitted to the control CPU 110 through the LAN 10 and the NIC 122.

Software such as the first OS, the second OS, and the apparatus control FW is executed by the control CPU 110, and the control CPU 110 configures a control unit according to an embodiment of the present invention together with the scanner control unit 132, the operation unit control unit 142, the display switching unit 143, the printer control unit 152, the communication control unit 121, and the like.

Next, the basic operation of the image forming apparatus 1 will be described.

First, the sequence for storing image information in the image forming apparatus 1 will be described.

First, in the image forming apparatus 1, in the case in which image information is generated by scanning the image of a document using the scanner unit 130, the image of the document is optically scanned from the document by the seamier unit 130 using the CCD 131. At this time, the operation of the CCD 131 is controlled by the scanner control unit 132 that receives an instruction from the control CPU 110.

Data processing is performed on the image, which has been scanned by the CCD 131, by the scanning processing unit 116, and the processed image information is stored in the image memory 114 or the HDD 115 through the DRAM control IC 111. The image information or the printing information stored in the image memory 114 or the HDD 115 can be managed as a job by the control CPU 110.

In the case in which the image information is acquired from the outside, job information, for example, transmitted from the image forming apparatuses 2 to 5 or a PC not illustrated in the drawing, and the like through the LAN 10 is stored in the image memory 114 or the HDD 115 through the NIC 122 and the control CPU 110 by the DRAM control IC 111.

On the other hand, in the case in which image information is generated by an application in the image forming apparatus 1, the image information acquired through the printer driver, the emulator, or the apparatus control FW is stored in the image memory 114 or the HDD 115 as described above. At this time, the print data transmitted from the printer driver can be received as a job of the image forming apparatus 1 and perform storage, execution, and the like of the job.

In the case in which image information that is acquired from the outside or acquired by an application operating in the image forming apparatus 1 is vector data, a raster image processing (RIP) is performed by a controller at an appropriate time.

In the case in which an image is output by the image forming apparatus 1, that is, in the case in which the image forming apparatus 1 is used as a copying machine or a printer, job information that includes image information stored in the image memory 114 or the HDD 115 is transmitted to the writing processing unit 117 through the DRAM control IC 111, and write data is transmitted from the writing processing unit 117 to the printer unit 150.

In the printer unit 150, after the surface of a photoreceptor is uniformly charged by a charging unit not illustrated in the drawing, a latent image is formed by perforating exposure scanning based on the write data using a laser beam of the LD 151, and a toner image is formed on the surface of the photoreceptor by performing reversal development of the latent image using a developing unit. Then, a sheet fed from the sheet feed tray is sent to a transfer position by a conveyance device, and the toner image is transferred at the transfer position by a transfer unit. Thereafter, the sheet on which the image is formed is heated and fixed by a fixing unit and is conveyed to the FNS 160. The FNS 160 to which the sheet having an image formed thereon is conveyed is equipped with a punching unit that punches sheets, a stapler that staples sheets, and the like and performs desired post processing on the sheets.

In the case in which output is performed based on data of any one of the external image forming apparatuses 2 to 5 or the PC, the outputting can be performed by transmitting the data to the apparatus control FW using a printer driver loaded into one of the image forming apparatuses 2 to 5 or the PC.

Also in the case in which data that is present in the second OS is output, the second OS is an OS that is used by a general PC, and thus the data can be output to the apparatus control FW of the main body apparatus by designating the main body apparatus as an output destination printer by using the same printer driver that is loaded in the external PC or the like. Namely, data can be output without the necessity for generating a dedicated printer driver. In such a case, the output is received as a job by the apparatus control FW, and the output process can be performed.

As described above, data can be output without the necessity for a dedicated printer driver in the image forming apparatus 1. However, in this embodiment, a dedicated printer driver may be prepared, and the type of the printer driver is not limited to a general purpose driver or a dedicated purpose driver.

The H/W that is specific to the image forming apparatus cannot be controlled by the second OS that is used by a general PC (for example, the management of the thermal fixing temperature or the like). However, since the second OS executes on the first OS that starts the apparatus control FW, which controls the apparatus, the second OS can perform control through the apparatus control FW. By defining a command in the application operated by the second OS and the apparatus control FW, for example, the application transmits a command for "setting the fixing temperature to x degrees" to the apparatus control FW, and the apparatus control FW that has received the command analyzes the content of the command and controls the H/W, thereby controlling the main body apparatus through the apparatus control FW on the second OS. As described above, the main body apparatus can be controlled also from the second OS. Namely, by configuring the apparatus control FW to have a command reception function and the second OS to have a command transmission function, a command can be issued and executed between mutually different OS's.

When an image is to be output, the control CPU 110 performs an output process based on the job information. The job information includes output condition information in addition to the image information described above. The output condition is configured by information such as a print mode, sheet information, a sheet feed tray, a sheet discharge destination, and a post-processing condition. Specifically, as examples of the output condition, there are the number of pixels of an output image, color/monochrome, single side/double side, color adjustment, a sheet size, the direction of a sheet, the type of sheet (type of paper, the weight, the color of the sheet, and the like), selection of a sheet feed tray, presence/no presence of post-processing, a post-processing condition, and the like. The output condition corresponds to the printing condition.

A standard setting is determined in advance as the initial setting of the output condition. The output condition can be set by the operation unit 140. In the case in which image information is acquired, the operation unit control unit 142 is controlled by the control CPU 110, and a screen to which an output setting can be input is displayed on the LCD 141.

When an appropriate operation input is made by an operator, the control CPU 110 is notified of the information such as the output condition (the print mode, the sheet feed tray, the sheet discharge destination, the post-processing condition, and the like) set on the operation unit 140 is notified to the control CPU 110 from the operation unit control unit 142. The control CPU 110 that has received the information generates output condition information and temporarily stores the generated output condition information in a memory included in the control CPU 110. When image information is acquired, the output condition information is stored in the image memory 114 or the HDD 115 as job information together with the image information.

In the case in which an output process is performed through the printer driver of the second OS, the job can be handled as a job of which the output condition is set through the printer driver, and the output condition of the job may be further set in the apparatus control FW.

In this embodiment, the image forming system is configured by the plurality of the image forming apparatuses 2 to 5 that are interconnected through the LAN 10, and each one of the image forming apparatuses has the same configuration as the control blocks illustrated in FIG. 3 and can execute a multi-OS environment. In the case in which a guest OS executed by the Multi-OS is fee-based, when a license is prepared for each machine, the cost increases. Accordingly, a case may be considered in which the image data of an OS is placed in an HDD of a specific machine, and the machine is used as a base. The HDD, in which the image data of the second OS is stored, is configured to be separate from an HDD handling image data and, for example, has a configuration such as a USB connection that does not have influence on data input/output.

Here, for example, when the guest OS is executed in an image forming apparatus in a multi-OS environment, in the case in which resources, which are used in the guest OS, such as a memory and a CPU are desired to be used by the image forming apparatus in accordance with an job input or the like, the guest OS can be executed in another image forming apparatus using a live migration function of the emulator.

Based on the apparatus operating condition such as a job input, it can be determined whether resources of the guest OS are to be used by the host OS by the image forming apparatus 1. In the case in which the resources are determined to be used by the host OS, another image forming apparatus that executes the guest OS is determined based on the state of the apparatus on the network, and the guest OS is executed on another image forming apparatus by using a live migration function. By displaying screen information supplied from the VNC server of another image forming apparatus on the screen of the image forming apparatus 1, a user can continue the process without considering the image forming apparatus operating the guest OS.

Figure 4:
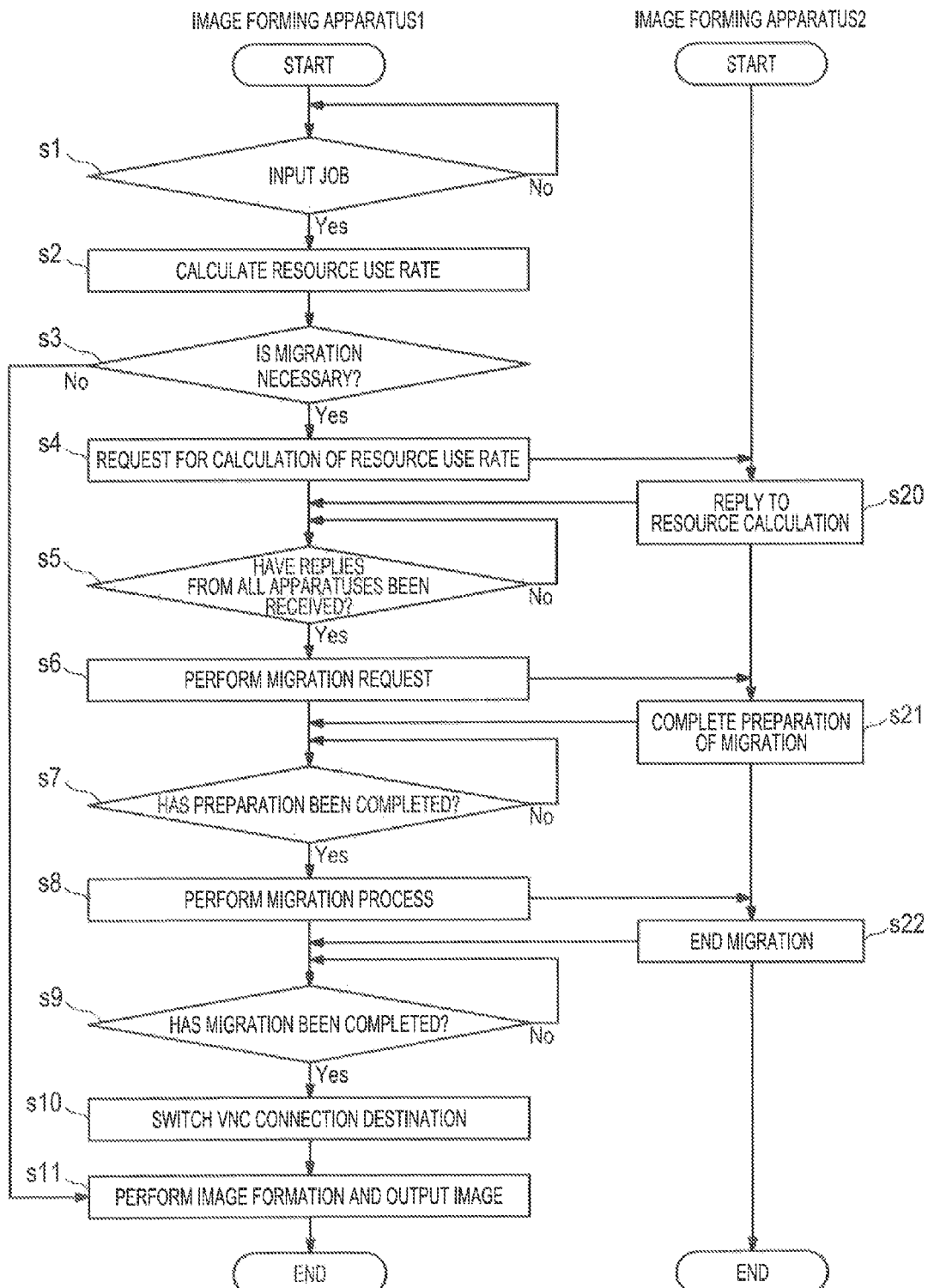
FIG. 4 is a flowchart illustrating the sequence of determining whether migration of a second OS is to be performed based on a job input.

The sequence of determining whether migration between the image forming apparatuses 1 and 2 is performed will be described with reference to a flowchart illustrated in FIG. 4. Each sequence is performed under the control performed by the control unit of each image forming apparatus. Hereinafter, this applies the same as above.

When operations are started by the image forming apparatuses 1 and 2, and the process is performed by displaying the screen of the second OS on the operation unit or the like in the image forming apparatus 1 to which an HDD, in which data of the second OS is stored, is connected, in the case in which a job is input (Yes in Step s1), the control unit of the image forming apparatus 1 calculates the resource use rate relating to the job in Step s2.

For example, the resource use rate is acquired based on the type and the amount of the job and the use state of the second OS. Specifically, for example, a numerical value is acquired based on the type of input job and the number of pages the resolution, the image quality, and the image size of the job, the memory use rate and the CPU use rate of the apparatus control FW and the second OS, the HDD use rate, and the like and is calculated as a resource use rate.

For example, based on the image size (A4)+the format (PS)+the page number (10) and the layout (2 in 1), a memory of 200 MB, an occupancy rate 30% of a CPU with 2 cores, an HDD of 200 MB, and the like are calculated to be required, and the similar calculation can be performed for the operation of the second OS.

Subsequently, it is determined whether to process the second OS using the image forming apparatus 1 or to perform migration based on the calculated resource use rate in Step s3. The determination can be performed with a criterion being set in advance.

For example, a determination can be made using a criterion of performing migration in the case in which the use rate of the CPU, the memory, and the HDD exceeds 50% and processing the second OS using the image forming apparatus in the case in which the use rate is 50% or less. In addition, for example, when information is acquired through the apparatus control FW, a determination may be made using a criterion of performing migration in the case in which the transmission speed of 100 MB/sec is unable to be satisfied by the performance of the HDD, a criterion of performing migration in the case in which the transmission speed is below 50% of the maximum transmission speed in the performance of the network, or the like. Such a criterion may be set for each image forming apparatus in consideration of the performance of the image forming apparatus or may be set by a user.

In the case in which the migration is determined not to be necessary (No in Step s3), as usual, a ripping process, an image forming process, and an output process are performed based on the PDL data in Step s11, and the process ends.

On the other hand, in the case in which migration is determined to be necessary (Yes in Step s3), in order to acquire the state of the image forming apparatus 2, a resource use rate calculating request is made for the image forming apparatus 2 through the network in Step s4. The image forming apparatus 2 that has received the request calculates a resource use rate of the apparatus in accordance with the request as described above and replies for the image forming apparatus 1 with the calculated resource use rate through the network in Step s20.

In the case in which there is a plurality of image forming apparatuses 2 which are connected to the network and in which the second OS can execute, the image forming apparatus 1 requests all the corresponding image forming apparatuses to calculate the resource use rates and waits for replies from all the apparatuses in Step s5.

When the calculation results are received from all the apparatuses (Yes in Step s5), the image forming apparatus 1 compares the resource use rates of the image forming apparatuses and, for example, determines an image forming apparatus 2 having a lowest resource use rate, and issues a migration request to the corresponding image forming apparatus 2 through the network in Step s6.

The image forming apparatus 2 that has received the migration request prepares migration and, when the preparation of the migration is completed, notifies the image forming apparatus 1 of the completion thereof in Step s21. In the preparation of the migration, acquisition of a storage area from the memory, acquisition of a storage area of the HDD, and the like are performed.

The image forming apparatus 1 waits for the notification of the completion of the migration preparation in Step s7. When the completion of the preparation is checked (Yes in Step s7), the image forming apparatus 1 performs a migration process in Step s8. Namely, the operating state of the second OS in the image forming apparatus 1 is transmitted to the image forming apparatus 2 through the network. The image forming apparatus 2 to which the operating state of the second OS has been transmitted performs migration for starting the second OS in accordance with the content of the transmitted operating state, enables a second operation screen to be provided by the function of an operation screen server, and notifies the image forming apparatus 1 of the completion of the migration in Step s22.

The image forming apparatus 1 waits for the notification of the completion in Step s9. When the completion of the migration is cheeked (Yes in Step s9), the image forming apparatus 1 opens resources used by the emulator and the second OS by ending the emulator and the second OS so as to be usable for the apparatus control FW. In addition, the connection destination of the operation screen client is switched to the operation screen server of the image forming apparatus 2, and whereby the operation of the second OS can be performed by the image forming apparatus 1 in Step s10. Subsequently, an image is formed, the image is output, and the process ends in Step s11.

As described above, in the image forming apparatus 1, the resources are used for an input job, and the process of the second OS can be continued, and whereby the writing process is improved.

Namely, even in the case in which resources are needed for an output process such as an job input in the apparatus in which the multi-OS executes, and the second OS needs to end, the second OS can execute from the same state in another apparatus, and whereby a user can continue to perform a job.

In addition, in the case in which the second OS executes in the image forming apparatus 1, and the second operation screen of the second OS is provided by the operation screen server to another image forming apparatus, when migration to the image forming apparatus 2 is performed according to the above-described sequence, by notifying another image forming apparatus of the connection destination of the VNC in Step s10, the other image forming apparatus can continue the process of the second OS.

Figure 5:
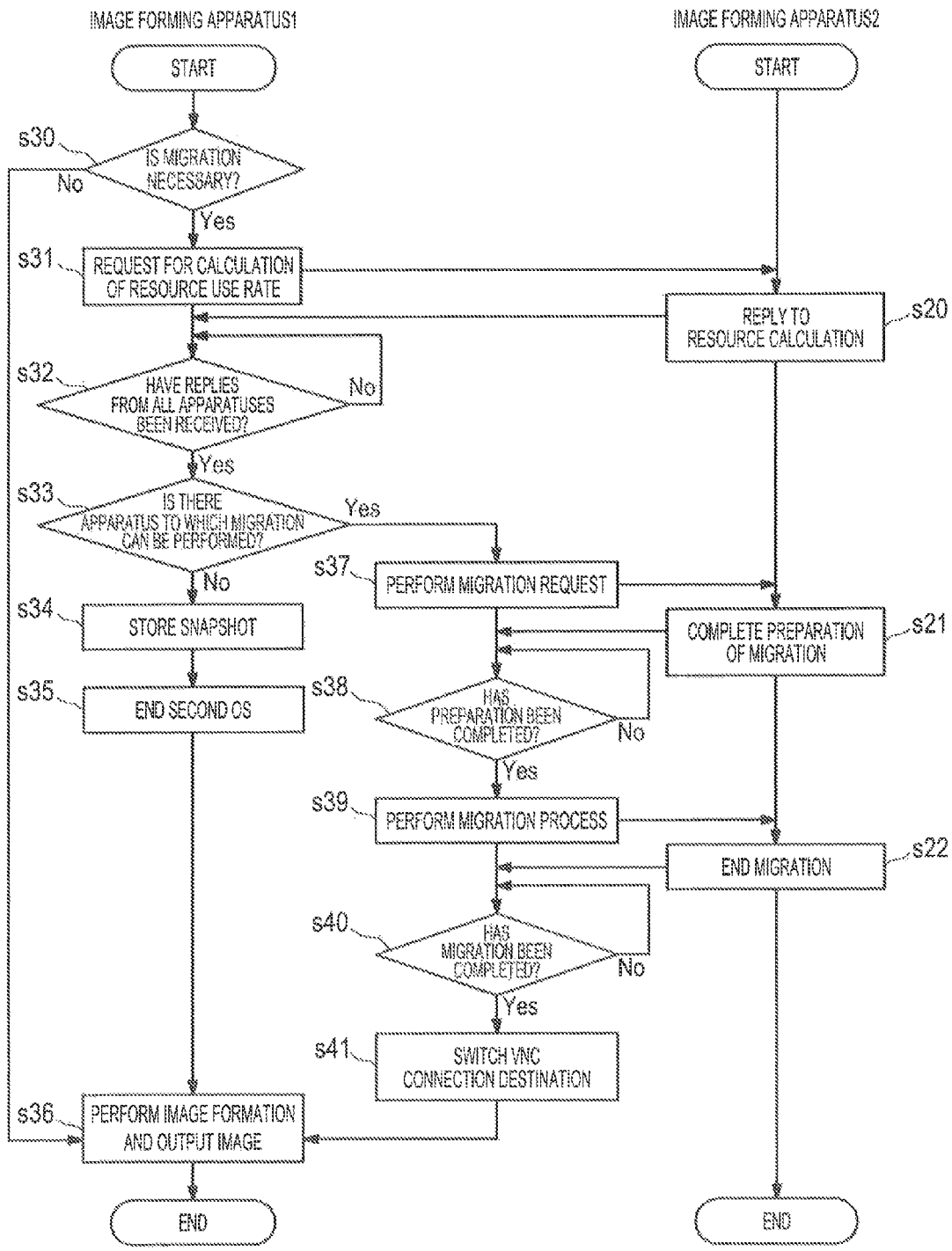
FIG. 5 is a flowchart illustrating the sequence of determining whether migration of the second OS is to be performed in consideration of a reserved job.

Next, another embodiment will be described with reference to a flowchart illustrated in FIG. 5.

In the above-described embodiment, while the resource use rate is calculated based on the number of pages of the input job and the like to be processed, the resource use rate may be calculated in consideration of reserved jobs as in the case in which the resource use rate is calculated in consideration of the number of jobs reserved at that time, and the number of pages, the resolution, the image quality, and the image size of each job.

When the resource use rate is calculated based only on a job to be processed, in the case in which there are many reserved jobs, and a job that is in the middle of the process does not require resources, there is a possibility that the resource use rate is determined to be low. Thus, the resource use rate is calculated in consideration of reserved jobs as well, and it is determined that "the image forming apparatus 1 needs resources from now on, and migration to another image forming apparatus is necessary" in the determination of the migration process, an apparatus to which the migration can be performed is determined, and the migration can be performed.

It is determined whether migration is needed from the above-described viewpoint in Step s30. Then, in the case in which the migration is determined not to be necessary (No in Step s30), as usual, a ripping process, an image forming process, and an output process are performed based on the PDL data in Step s36, and the process ends.

On the other hand, in the case in which the migration is determined to be necessary, data may be stored by using a snapshot function so as to resume the process from the same state in the case in which the resource use rate is more than that of the image forming apparatus 1 in any one of all the other apparatus.

From such a viewpoint, in the case in which the migration is determined to be necessary (Yes in Step s30), the image forming apparatus 2 is requested to calculated a resource use rate in Step s31. In the case in which there are a plurality of image forming apparatuses 2 in which the second OS can executes, such a request is made for each one of the image forming apparatus 2. The image forming apparatus 2 that has received the request calculates a resource use rate in response to the request and replies to the request with the calculation result.

The image forming apparatus 1 waits for replies from all the target image forming apparatuses 2 in Step s32 and then determines whether there is an apparatus to which the migration can be made in Step s33 when there are replies from all the apparatuses (Yes in Step s32). For example, such a determination may be made based on whether there is an image forming apparatus 2 having a resource use rate lower than the image forming apparatus 1 as described above.

In the case in which there is no apparatus to which the migration can be made (No in Step s33), that is, in the case in which the resource use rate of each one of all the apparatuses is the resource use rate of the image forming apparatus 1 or more, snapshot storage of the operating state of the second OS at that moment in the image forming apparatus 1 is performed in Step s34, the second OS ends in Step s35, as usual, an image forming process and an output process are performed in Step s36, and the process ends.

On the other hand, in the case in which there is an apparatus to which the migration can be made (Yes in Step s33), similar to the above-described embodiment, migration is performed.

Namely, the image forming apparatus 1 sets an image forming apparatus 2 having a resource use rate to be less than the image forming apparatus 1 and having a least resource use rate as a target and issues a migration request to the target image forming apparatus 2 through the network in Step s37.

The image forming apparatus 2 that has received the migration request prepares the migration and notifies the image forming apparatus 1 of the completion of the preparation at the time of completion of the preparation in Step s21. In the preparation of the migration, acquisition of a storage area in the memory, acquisition of a storage area of the HDD, and the like are performed.

The image forming apparatus 1 waits for the notification of the completion of the preparation of migration in Step s38 and, when the completion of the preparation is checked (Yes in Step s38), performs a migration process. Namely, the operating stale of the second OS in the image forming apparatus 1 is transmitted to the image forming apparatus 2 through the network in Step s39. The image forming apparatus 2 to which the operating state of the second OS has been transmitted performs migration for operating the second OS in accordance with the content of the operating state, enables the second operation screen to be provided by using the operation screen server function, and notifies the image forming apparatus 1 of the completion of the migration in Step s22.

The image forming apparatus 1 waits for the notification of the completion of migration in Step s40. When the completion of migration is checked (Yes in Step s40), the image forming apparatus 1 ends the emulator and the second OS, thereby opening the resources used by the emulator and the second OS so as to be usable for the apparatus control FW. In addition, the image forming apparatus 1 switches the connection destination of the operation screen client to the operation screen server of the image forming apparatus 2 in Step s41 and enables the image forming apparatus 1 to perform the operation of the second OS in Step s41. Thereafter, an image forming process and an output process are performed, and the process ends in Step s36.

In addition, in the case in which the second OS executes in the image forming apparatus 1, and the second operation screen of the second OS is provided to another image forming apparatus by the operation screen server, when the migration to the image forming apparatus 2 is performed in accordance with the above-described sequence, by notifying another image forming apparatus of the VNC connection destination in Step s41, the other image forming apparatus can continue the process of the second OS.

Next, a still another embodiment will be described.

Figure 6:
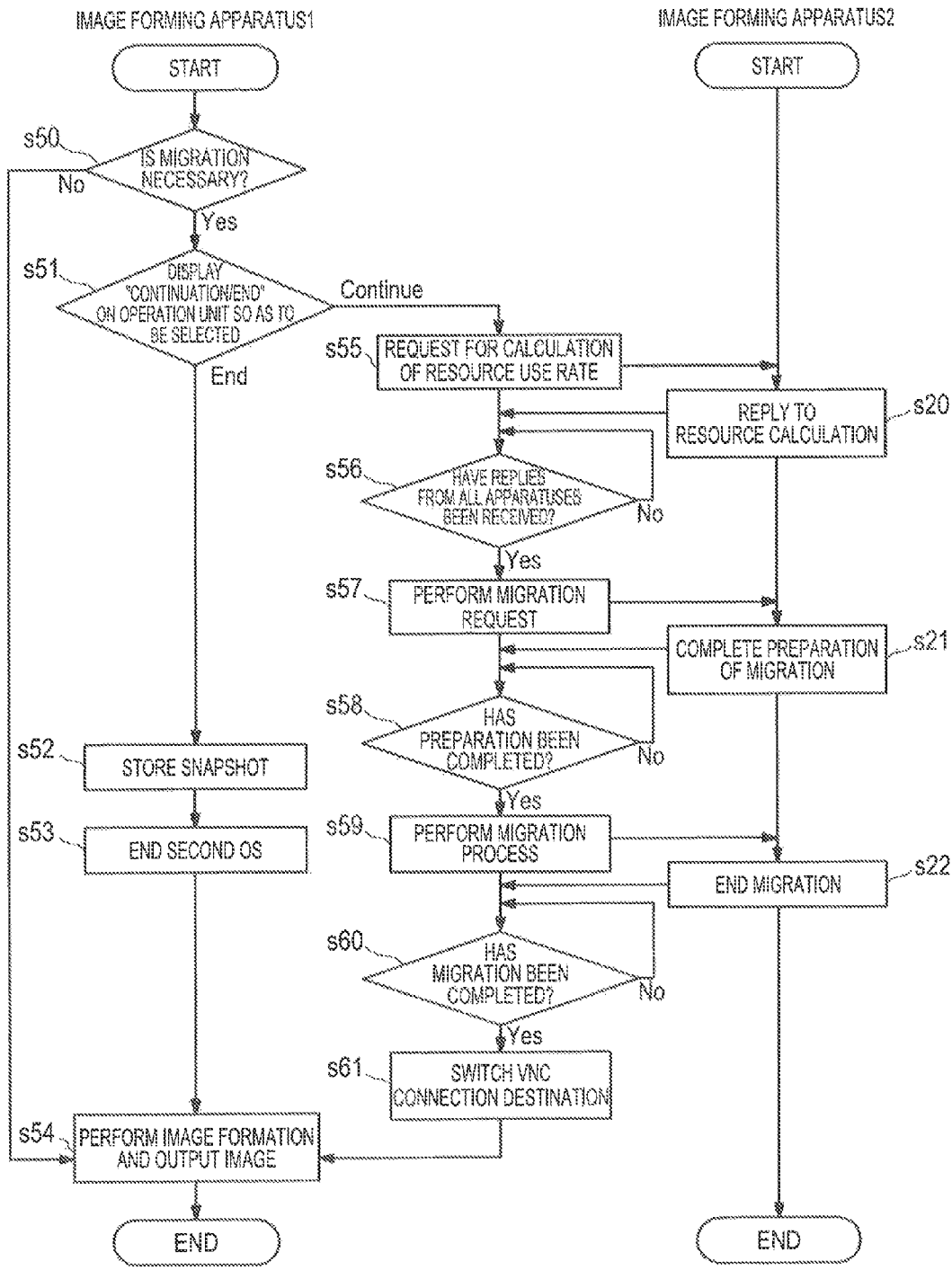
FIG. 6 is a flowchart illustrating the sequence of determining whether migration of the second OS is to be performed including the user's selection for continuing the second OS.

In the case in which migration is determined to be necessary, a content representing whether the process of the second OS is to be continued on the operation unit of the image forming apparatus 1 may be displayed so as to enable the user to make a selection. In the case in which the continuation is selected, the migration destination is checked. On the other hand, in the case in which the end of the process is selected, the data may be stored. Hereinafter, the process will be described in detail with reference to a flowchart illustrated in FIG. 6.

Similar to each embodiment described above, it is determined whether migration is necessary in Step s50. Then, in the case in which the migration is determined not to be necessary (No in Step s50), as usual, a ripping process, an image forming process, and an output process are performed based on the PDL data in Step s54, and the process ends.

On the other hand, in the case in which the migration is determined to be necessary (Yes in Step s50), continuation/end is displayed on the operation unit in a selectable manner, and whereby the user is enabled to perform an operation input in Step s51.

Figure 7:
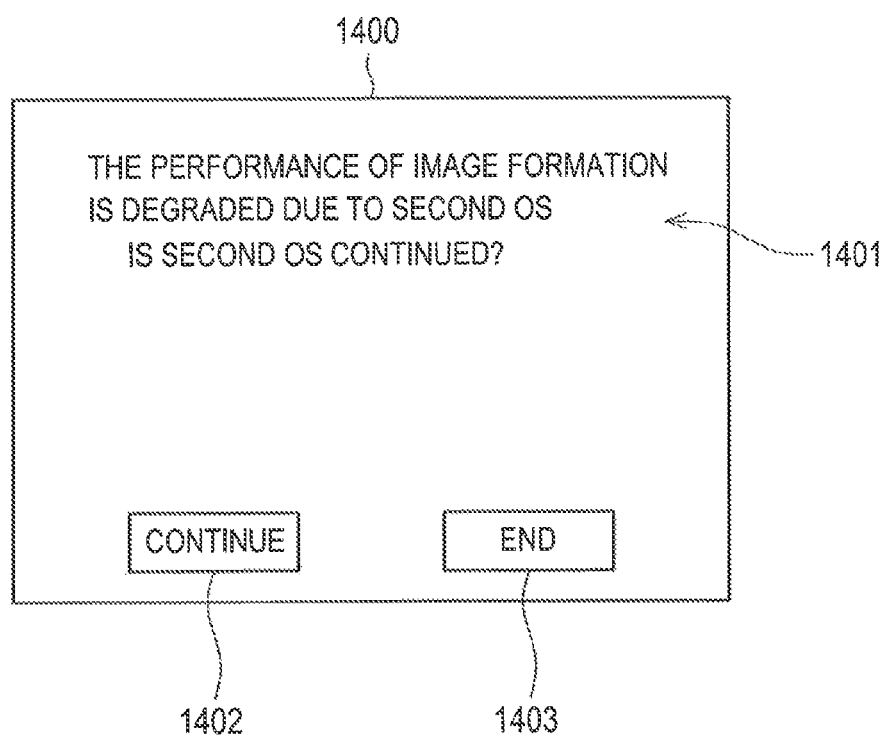
FIG. 7 is a diagram illustrating a screen for selecting to continue the second OS.

An example of a selection screen 1400 is illustrated in FIG. 7. On the selection screen 1400, a message 1401 inquiring whether to continue the connection of the second OS is displayed, and a continuation button 1402 and an end button 1403 are displayed so as to be pressed. The user selects one of the continuation button 1402 and the end button 1403 and presses the selected button, thereby perforating a continuation process or an end process.

In the case in which the end is selected (end in Step s51), similar to the above-described embodiment, snapshot storage of the second OS is performed in Step s52, the second OS ends in Step s53, as usual, an image forming process and an output process are performed in Step s54, and the process ends.

On the other hand, the continuation is selected on the operation unit (continuation in Step s51), in order to acquire the state of the image forming apparatus 2, a resource use rate calculating request is made for the image forming apparatus 2 through the network in Step s55. The image forming apparatus 2 that has received the request calculates a resource use rate of the apparatus in accordance with the request as described above and replies for the image forming apparatus 1 with the calculated resource use rate through the network in Step s20.

In the case in which there is a plurality of image forming apparatuses 2 which are connected to the network and in which the second OS can execute, the image forming apparatus 1 requests all the corresponding image forming apparatuses to calculate the resource use rates and waits for replies from all the apparatuses in Step s56.

When the calculation results are received from all the apparatuses (Yes in Step s56), the image forming apparatus 1 compares the resource use rates of the image forming apparatuses and, for example, determines an image forming apparatus 2 having a lowest resource use rate, and issues a migration request to the corresponding image forming apparatus 2 through the network in Step s57.

The image forming apparatus 2 that has received the migration request prepares migration and, when the preparation of the migration is completed, notifies the image forming apparatus 1 of the completion thereof in Step s21. In the preparation of the migration, acquisition of a storage area from the memory and acquisition of a storage area of the HDD are performed.

The image forming apparatus 1 waits for the notification of the completion of the migration preparation in Step s58. When the completion of the preparation is checked (Yes in Step s58), the image forming apparatus 1 performs a migration process. Namely, the operating state of the second OS in the image forming apparatus 1 is transmitted to the image forming apparatus 2 through the network in Step s59. The image forming apparatus 2 to which the operating state of the second OS has been transmitted performs migration for starting the second OS in accordance with the content of the transmitted operating state, enables a second operation screen to be provided by the function of an operation screen server, and notifies the image forming apparatus 1 of the completion of the migration in Step s22.

The image forming apparatus 1 waits for the notification of the completion of the migration in Step s60. When the completion of the migration is checked (Yes in Step s60), the image forming apparatus 1 opens resources used by the emulator and the second OS by ending the emulator and the second OS so as to be usable for the apparatus control FW. In addition, the connection destination of the operation screen client is switched to the operation screen server of the image forming apparatus 2, and whereby the operation of the second OS can be performed by the image forming apparatus 1 in Step s61. Subsequently, an image is formed, the image is output, and the process ends in Step s54.

As described above, in the image forming apparatus 1, the resources are used for an input job, and the process of the second OS can be continued, and whereby the usability is improved.

In addition, in the case in which the second OS executes in the image forming apparatus 1, and the second operation screen of the second OS is provided by the operation screen server for another image forming apparatus, when migration to the image forming apparatus 2 is performed according to the above-described sequence, by notifying another image forming apparatus of the connection destination of the VNC in Step s61, the other image forming apparatus can continue the process of the second OS.

In addition, in the above-described embodiment, as a result of the reception of calculated resource use rates from all the apparatuses, similar to the previous embodiment, the same processing sequence may be performed based on whether or not there is an apparatus to which migration can be performed.

Next, a still another embodiment will be described.

Figure 8:
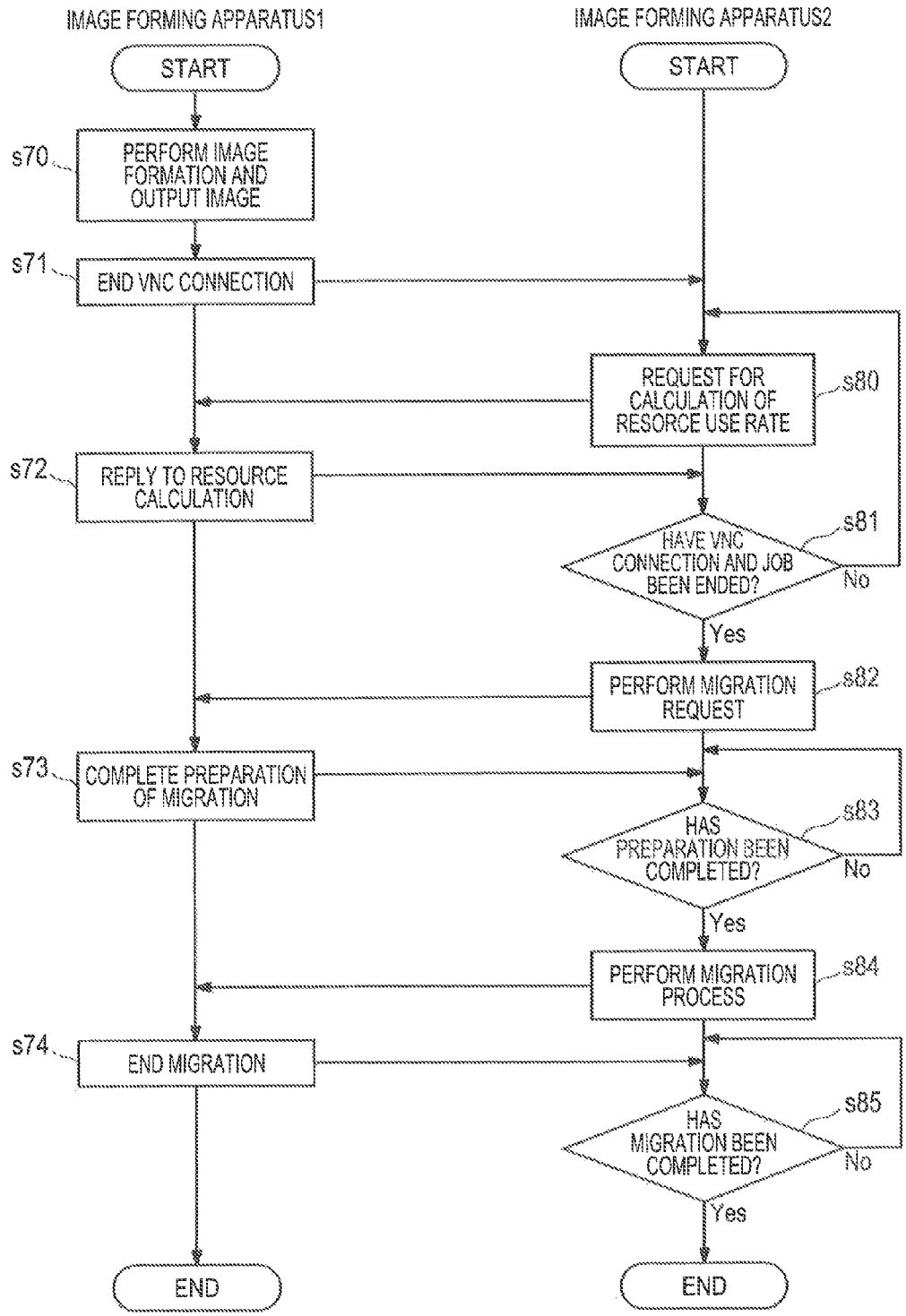
FIG. 8 is a flowchart illustrating the sequence of determining whether remigration to the image forming apparatus 1 after the migration of the second OS in the image forming apparatus 2 is performed.

In the second OS for which the migration from the image forming apparatus 1 has been performed may inquire the image forming apparatus 1 of the resource use rate after the end of the VNC connection from the image forming apparatus 1 and, in the case in which the job is determined to end (there are resources to space), in order not to use network resources, migrate to the image forming apparatus 1 again. Hereinafter, the process will be described in detail with reference to a flowchart illustrated in FIG. 8.

An image forming process and an output process are performed in Step s70, and a notification of the end of the VNC connection is performed to the image forming apparatus 2 having the VNC connection.

The image forming apparatus 2 that has been notified thereof requests the image forming apparatus 1 to calculate a resource use rate in Step s80. The image forming apparatus 1 that has received the request, similar to each embodiment described above, calculates a resource use rate in response to the request and replies to the request with the calculation result for the image forming apparatus 2 in Step s72.

The image forming apparatus 2 that has received the calculation result of the resource use rate determines whether the VNC connection between the image forming apparatuses 1 and 2 has ended and the job of the image forming apparatus 1 has been ended in Step s81. In the case in which the VNC connection has not ended or the job has not been ended (No in Step s81), the process is returned to Step s80, and the process is repeated. On the other hand, in the case in which the VNC connection has been ended, and the job has been ended (Yes in Step s81), the image forming apparatus 2 transmits a migration request to the image forming apparatus 1 in Step s82.

The image forming apparatus 1 that has received the migration request prepares migration and, when the preparation of the migration is completed, notifies the image forming apparatus 2 of the completion thereof in Step s73. In the preparation of the migration, acquisition of a storage area from the memory and acquisition of a storage area of the HDD are performed.

The image forming apparatus 2 waits for the notification of the completion of the migration preparation in Step s83. When the completion of the preparation is checked (Yes in Step s83), the image forming apparatus 2 performs a migration process. Namely, the operating state of the second OS in the image forming apparatus 2 is transmitted to the image forming apparatus 1 through the network in Step s84. The image forming apparatus 1 to which the operating state of the second OS has been transmitted performs migration for starting the second OS in accordance with the content of the operating state and notifies the image forming apparatus 2 of the completion of the migration in Step s74.

The image forming apparatus 2 waits for the notification of the completion of the migration in Step s85. When the completion of the migration is checked (Yes in Step s85), the image forming apparatus 2 opens resources used by the emulator and the second OS by ending the emulator and the second OS so as to be usable for the apparatus control FW.

As described above, in the image forming apparatus 1, the resources that are open due to the end of a job are used in accordance with the migration performed again, and the process in the second OS can be continued by opening the network resources, whereby the usability is improved.

According to an embodiment of the present invention, a second operating system that is operable in parallel with the operation of a first operating system can be switched to be executed in another image forming apparatus based on the process state relating to image formation of an image forming apparatus in which the second operating system executes, and thus the degradation of the performance of the process relating to image formation due to the operation of the second operating system can be prevented in advance.

Namely, in accordance with the process relating to image formation, the operating system used for the other processes is migrated, the resources of the image forming apparatus is secured, and the process of the other operating system can be performed without waiting for the process, and whereby the usability can be improved.

As described above, the embodiments of the present invention have been described. However, the present invention is not limited to the contents of the description presented above and may be appropriately changed in a range not departing from the scope of the present invention.

CROSS-REFERENCE TO RELATED APPLICATION

This application is based on Japanese Patent Application No. 2012-252707 filed with Japan Patent Office on Nov. 16, 2012, the entire content of which is hereby incorporated by reference.

What is claimed is:

1. An image forming apparatus that is connected to be communicable with a network having a plurality of additional image forming apparatuses different from each other, the image forming apparatus comprising:
a printer unit that forms an image based on image data and outputs the image onto a sheet;
a communication unit that enables a connection with the network; and
a control unit that can execute a first operating system activating on the image forming apparatus and a control program activating on the first operating system and performing a process relating to image formation, and the control unit enables operation of a second operating system performing a process other than the process relating to image formation in parallel with the operation of the first operating system,
wherein the control unit selects and determines one of the plurality of additional image forming apparatuses in which the second operating system is operable based on a process state relating to the image formation of the image forming apparatus being executed, transmits an operating state of the second operating system to the one of the plurality of additional image forming apparatuses, and switches processing of the second operating system to the one of the plurality of additional image forming apparatuses,
wherein, in the one of the plurality of additional image forming apparatuses in which the second operating system executes in accordance with the switching, an operation screen server is operable which provides information of a second operation screen in the second operating system to a further one of the plurality of additional image forming apparatuses that is connected to the one of the plurality of additional image forming apparatuses through the network and receives an operation input for the provided second operation screen, and
wherein the control unit includes an operation screen client that receives the information of the second operation screen in the second operating system that is provided by the operation screen server operating in the one of the plurality of additional image forming apparataus and enables an operation input for the second operation screen, and the control unit stops the second operating system on the one of the plurality of additional image forming apparatuses in accordance with a connection state between the operation screen server and the operation screen client and executes the second operating system in the image forming apparatus in which the second operating system executed before the switching again.

2. The image forming apparatus according to claim 1, wherein the control unit executes the second operating system in parallel with the operation of the first operating system.

3. The image forming apparatus according to claim 1, wherein the control unit provides information of the second operation screen in the second operating system to the one of the plurality of additional image forming apparatuses, and operates the operation screen server receiving an operation input for the second operation screen provided to the one of the plurality of additional image forming apparatuses.

4. The image forming apparatus according to claim 1, wherein the control unit receives information of a second operation screen in the second operating system that is provided by the operation screen server executed in the one of the plurality of additional image forming apparatuses, and operates an operation screen client that enables an operation input for the second operation screen.

5. The image forming apparatus according to claim 1, wherein the control unit determines the process state relating to the image formation based on an input job.

6. The image forming apparatus according to claim 5, wherein the control unit performs the determination before executing the input job in accordance with a state of hardware resources that is based on the input job.

7. The image forming apparatus according to claim 1, wherein, in the case in which the second operating system is executed by the one of the plurality of additional image forming apparatuses in accordance with the switching, the control unit stops the second operating system on the one of the plurality of additional image forming apparatuses in accordance with a state of the image forming apparatus in which the second operating system executed before the switching and executes the second operating system by using the image forming apparatus in which the second operating system executed before the switching again.

8. An image forming system comprising:
the image forming apparatus according to claim 1 as a first image forming apparatus;
a second image forming apparatus; and
a network that connects the first image forming apparatus and the second image forming apparatus to be communicable with each other,
the second image forming apparatus including
a printer unit that forms an image based on image data and outputs the image onto a sheet,
a communication unit that enables a connection with at least the first image forming apparatus through the network, and
a control unit that can execute a first operating system activating on the image forming apparatus and a control program activating on the first operating system and performing a process relating to image formation, and the control unit enables operation of a second operating system performing other processes other than the image formation in parallel with the operation of the first operating system; and
wherein the control unit of the second image forming apparatus receives an operating state of the second operating system transmitted from the first image forming apparatus and executes the second operating system.

9. The image forming system according to claim 8,
wherein the control unit of the second image forming apparatus includes an operation screen server which provides information of the second operation screen in the second operating system to another image forming apparatus of the plurality of additional image forming apparatuses that is connected to the second image forming apparatus through the network and receives an operation input for the second operation screen that is provided for the another image forming apparatus of the plurality of additional image forming apparatuses, and
wherein the control unit of the first image forming apparatus in which the second operating system was operable before the switching includes an operation screen client that receives the information of the second operation screen in the second operating system that is provided by the operation screen server operating in the another image forming apparatus of the plurality of additional image forming apparatuses and enables an operation input for the second operation screen is operable, and the control unit of the second image forming apparatus, when the transmission is received and the second operating system is executed, provides information of the second operation screen for the first image forming apparatus in which the second operating system was operable before the switching.

* * * * *